Feb. 10, 1970  G. H. FATHAUER  3,494,437
ELECTRONIC SCALE
Filed Sept. 15, 1967  6 Sheets-Sheet 1
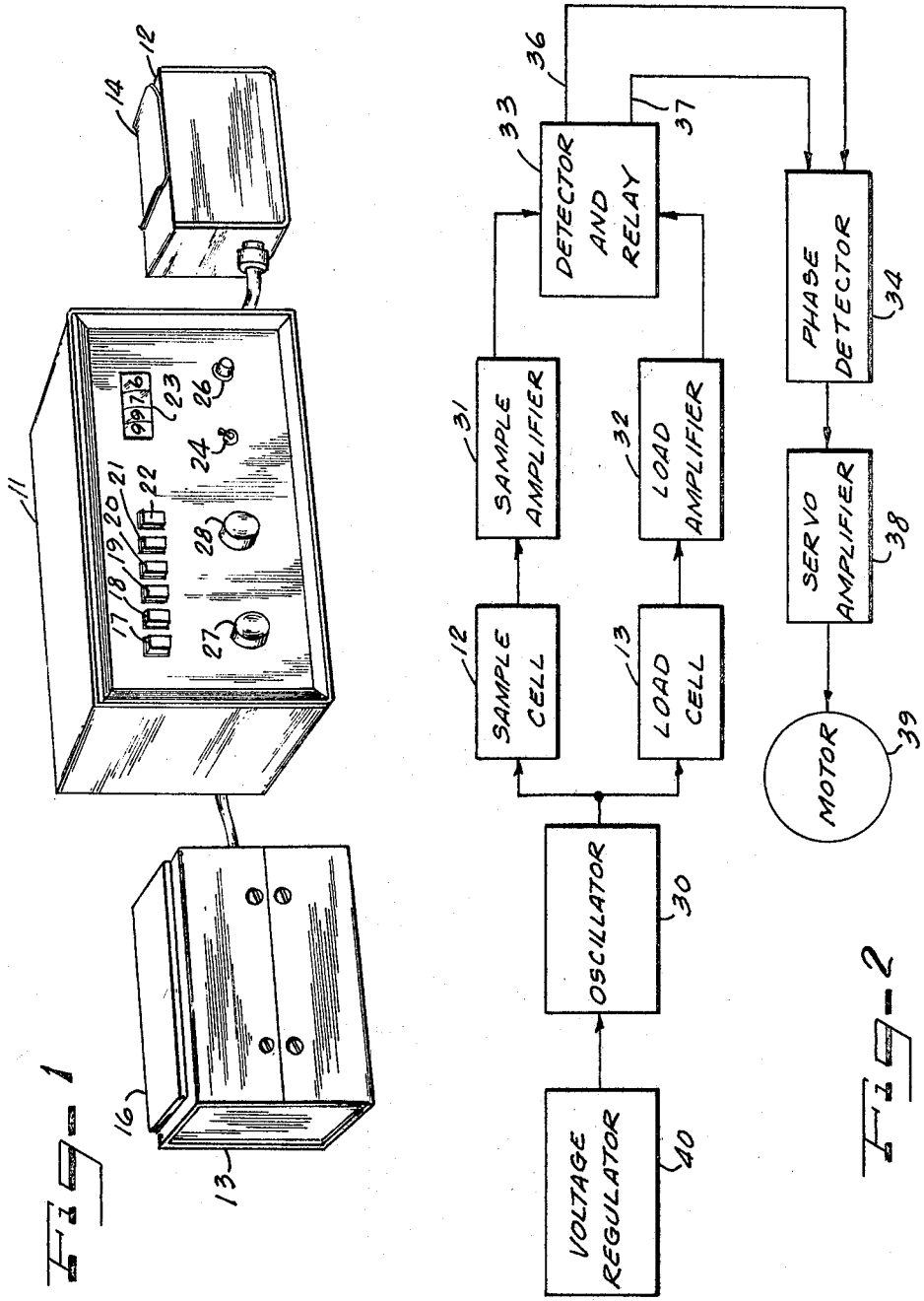
INVENTOR.
GEORGE H. FATHAUER
BY Hill, Sherman, Meroni, Gross & Simpson  ATTORNEYS Feb. 10, 1970  G. H. FATHAUER  3,494,437
ELECTRONIC SCALE
Filed Sept. 15, 1967  6 Sheets-Sheet 2

INVENTOR.
GEORGE H. FATHAUER
BY
ATTORNEYS

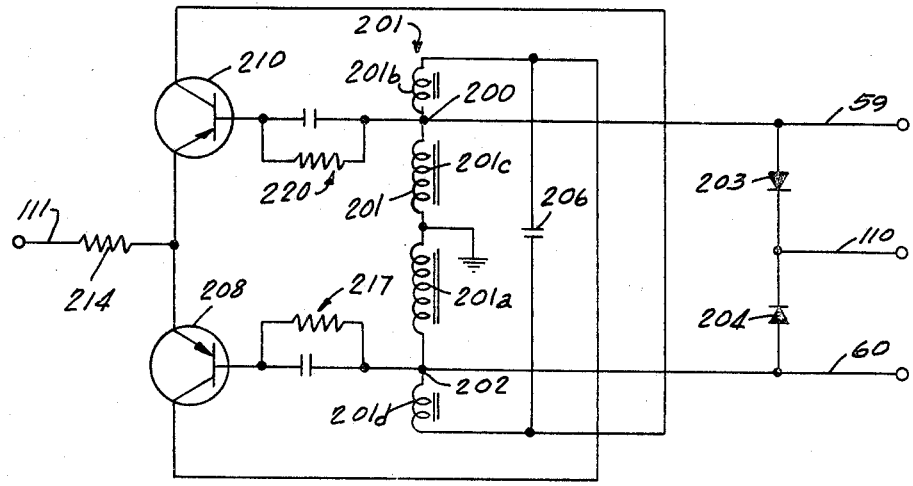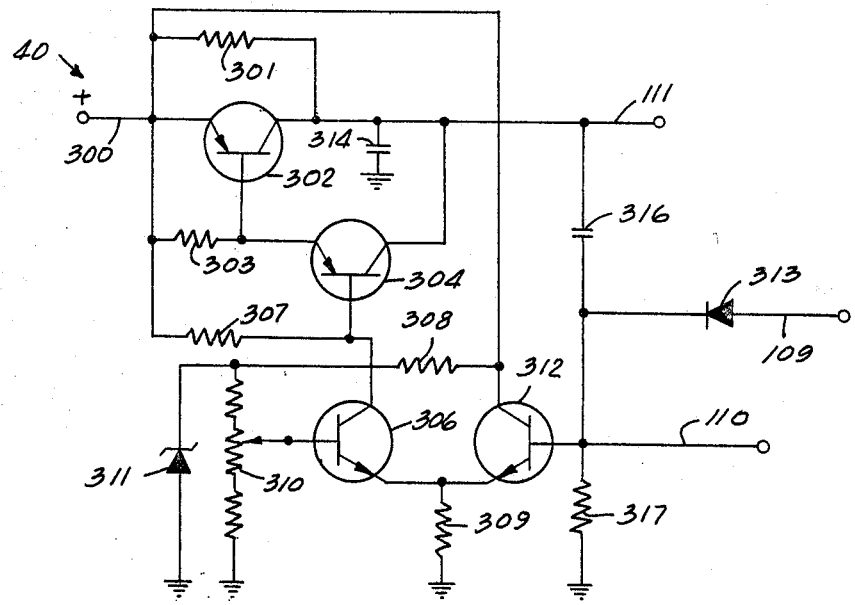

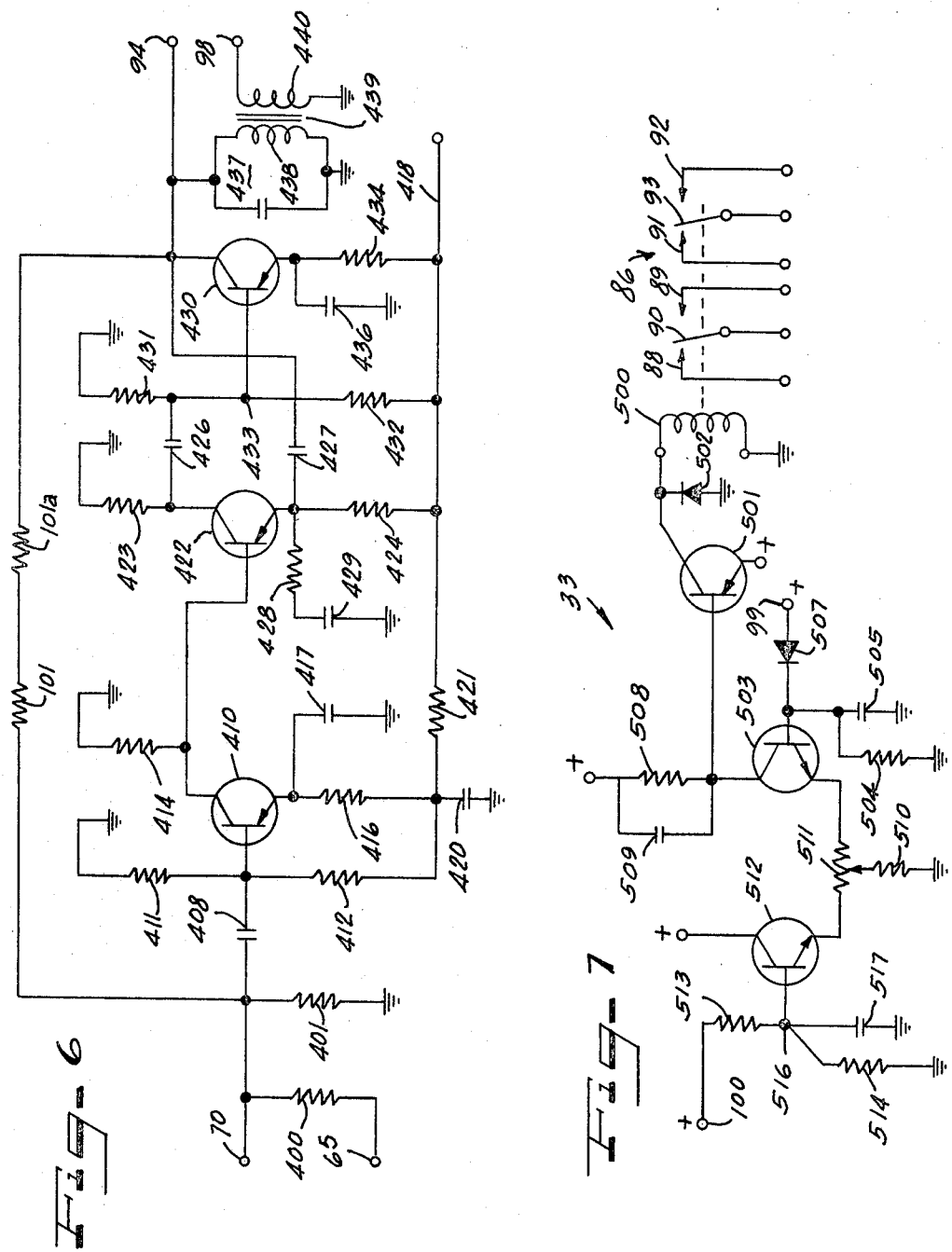

INVENTOR.
GEORGE H. FATHAUER

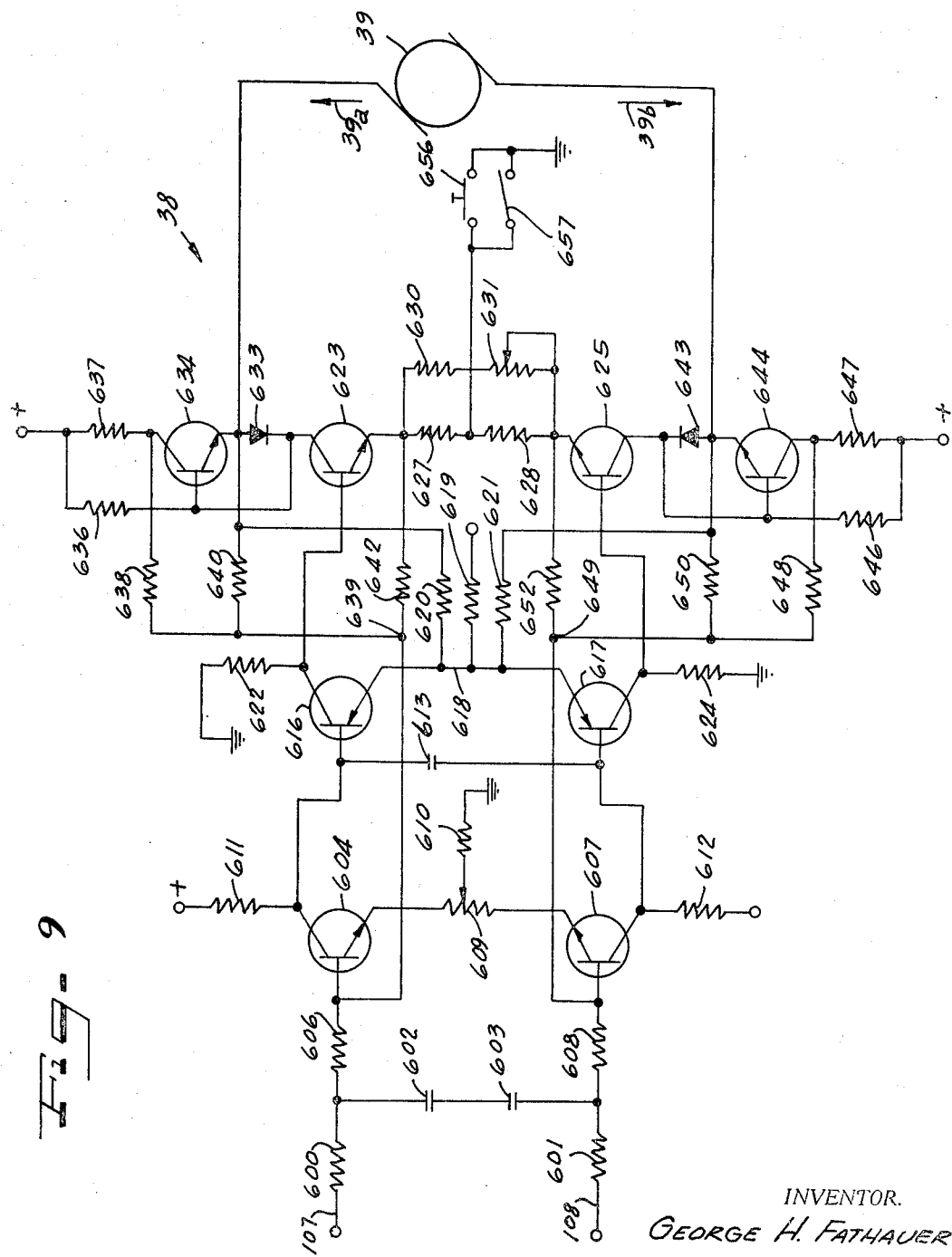

United States Patent Office 3,494,437
Patented Feb. 10, 1970

3,494,437
ELECTRONIC SCALE
George H. Fathauer, Decatur, Ill., assignor to The Dole Valve Company, Morton Grove, Ill., a corporation of Illinois
Filed Sept. 15, 1967, Ser. No. 668,076
Int. Cl. G01g 19/00, 7/00
U.S. Cl. 177—200        11 Claims

ABSTRACT OF THE DISCLOSURE

An electronic scale employs a circuit for comparing the outputs of a pair of load cells to provide an output signal in accordance with the loading of the cells to operate a readout device. Each of the load cells is provided with an amplifier which has a constant gain over a predetermined range that is effected by the provision of a feedback loop for maintaining a predetermined maximum voltage and an output thereof within a predetermined range of input current. This scale is further provided with a plurality of manually operable switches for selectively modifying the feedback resistance of a load amplifier to predetermined values to provide multiplication of the readout indication.

---

This invention relates generally to an electronic scale and more particularly to a weighing system for determining the number of parts in a homogeneous batch by providing a ratio of one or more samples to the entire batch.

The determination of the number of parts in a particular batch is the primary purpose of inventory counts. When the individual item is small and numerous, this determination is a difficult task. Simply counting the items one by one would be extremely impractical and, therefore, several methods have been devised for making an inventory count which greatly simplifies the operation.

One such method involves the weighing of one sample on a scale, weighing the entire batch on the same scale, and finding the ratio between the two weight readings. The accuracy of such an inventory counting method is, of course, relatively low, primarily since the same scale is employed for both the sample reading and the load or batch reading. If two scales are employed, each having a different scale, accuracy is not greatly improved, since the two scales cannot be accurately calibrated with respect to one another.

Another method of inventory counting involves the use of a beam whiich is pivoted near one end thereof with an indicator secured to the beam at the pivot point and movable relative to a graduated scale. A basket is supported on the beam at the end adjacent the pivot and several baskets are supported along the other end thereof at fixed distances from the pivot point. The beam forms a balance scale with the distances from the pivot to the respective baskets on opposite sides of the pivot point determining the ratio between the sample and the load. Such a balance scale is, of course, relatively bulky and impractical for large amounts of items.

It is, therefore, an object of the present invention to provide a reliable and accurate scale for determining a ratio between one or more samples of an item and a larger number of the same item.

It is another object of the present invention to provide a scale for determining a ratio of a sample to a load and which is capable of handling and counting large numbers of a particular item.

Still another object of the present invention is to provide a scale for determining a ratio between a sample and a load which is capable of providing a direct readout of the weight of either the sample or the load.

Another object of the present invention resides in the provision of a pair of load cells for receiving a sample item on one and a multitude of the same item on the other and which can be accurately calibrated with respect to one another.

These and other objects, features, and advantages of the present invention will be more fully realized and understood from the following detailed description when taken in conjunction with the accompanying drawings wherein:

FIGURE 1 is a view in perspective of one embodiment of the electronic scale constructed in accordance with the principles of the present invention;

FIGURE 2 is a block diagram of one embodiment of the system of the present invention illustrated in FIGURE 1;

FIGURE 4 is a schematic diagram of the excitation circuit or oscillator of FIGURE 3;

FIGURE 5 is a schematic diagram of a voltage regulator circuit employed in the block diagram illustrated in FIGURE 3;

FIGURE 6 is a schematic diagram of one of the amplifiers employed in the block diagram of FIGURE 3;

FIGURE 7 is a schematic diagram of a detector and relay circuit employed in the block diagram of FIGURE 3;

FIGURE 9 is a schematic diagram of a servoamplifier including a servomotor which form a part of the block diagram of FIGURE 3.

Like reference numerals through the various views of the drawings are intended to designate the same or similar structures.

Figure 3:
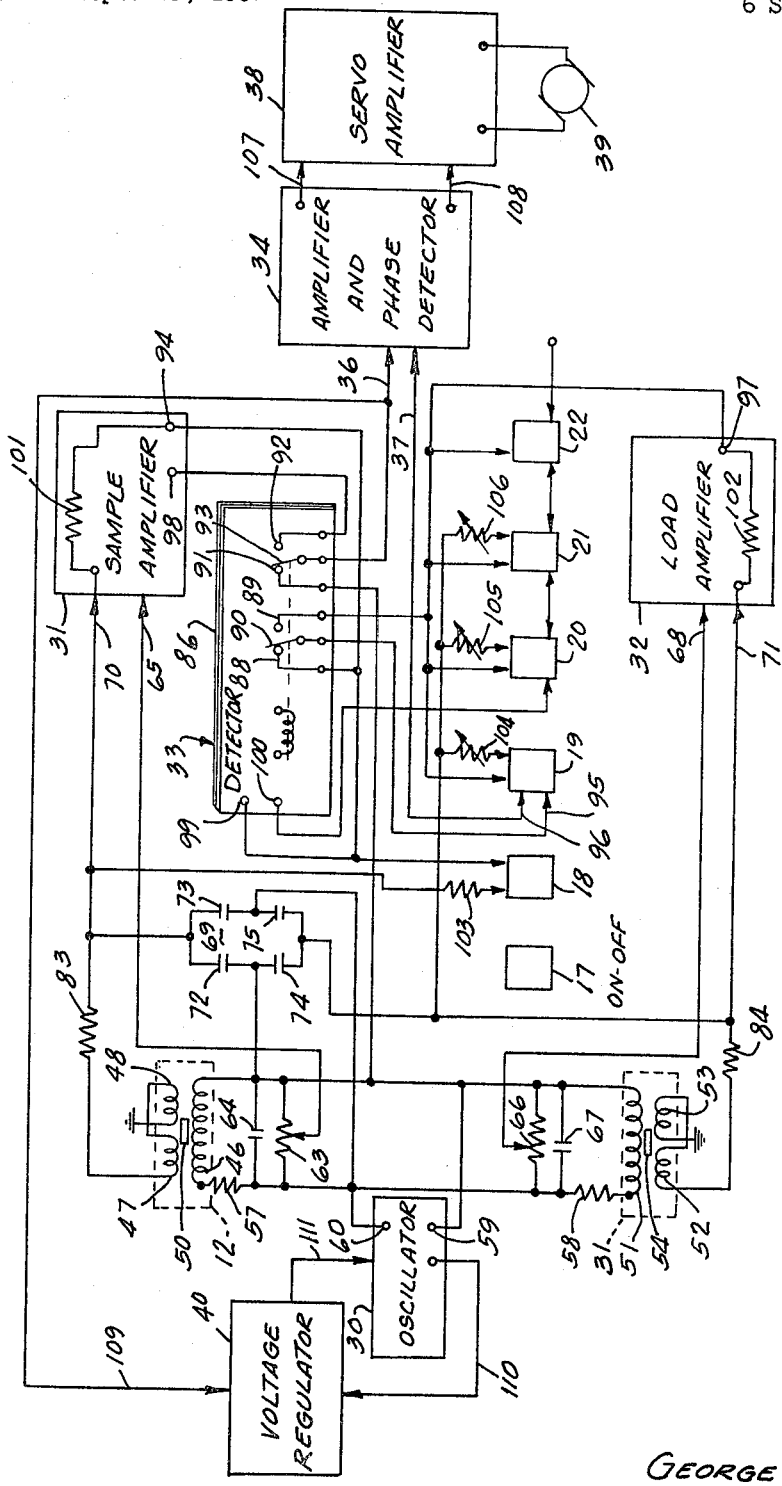
FIGURE 3 is a partially schematic and partially block diagram of the system illustrated in FIGURE 2.

With reference to the drawings in detail and in particular to FIGURE 1 there is shown one embodiment of an electronic scale constructed in accordance with the principles of this invention. A control console and monitoring unit 11 controls the operation of and monitors signals from a sample cell 12 and a load cell 13. The sample cell 12 has a scale platform 14 for receiving a sample part thereon. The load cell 13 has a scale platform 16 for receiving a plurality of parts which are to be weighed and compared with the weight of the sample part sensed by the sample cell 12. Therefore, if the weight sensed by the load cell 13 is one thousand times greater than the weight sensed by the simple cell 12, (the type of parts being sensed by both cells are customarily the same) the number of parts on the scale platform 16 is one thousand times greater than the number of parts on the scale platform 14.

The control unit 11 is provided with a plurality of push button switches 17–22. By way of example, the switch 17 is an on-off switch, while the switches 18–22 consist of test switches and load switches. A numerical direct readout 23 is provided on the front panel of the control unit 11. The direct readout 23 is preferably in terms of numbers of parts. That is, the direct readout 23 will produce a reading which is a ratio of the number of parts on the load cell 13 and the number of parts on the sample cell 12. Actuation of a readout control switch 24 provides a continuous readout of this ratio at the readout 23. Also, actuation of a momentary contact switch 26 energizes the readout 23 for a momentary readout of the ratio between the measured number of parts and the sample number of parts.

More particularly, actuation of the switch 18 provides an indication at the readout 23 of the weight of a sample on the sample cell 12. This reading can be accurate to within 0.01 gram. Actuation of the switch 19 provides an indication on the readout 23 of the weight of a load on the load cell 13. The switch 20 is a one multiplier, which upon actuation, provides an indication at the readout 23 of the ratio of a load weight on the cell 13 to a sample weight on the cell 12. If the number of samples are readily known, and one type of item is being weighed, this weight ratio provides an exact indication of the number of pieces in the load. That is, if a sample piece from a uniform batch is placed on the sample cell 12 and the remaining batch is placed on the load cell 13, an indication of the number of pieces in the batch is provided at the readout 23. Actuation of the switches 21 and 22 introduces a multiplier factor in the indication provided at the readout 23.

The multiplication factor introduced by switches 21 and 22 provides a change in the ratio between the weight on the sample cell 12 and the weight on the load cell 13. This ratio change is employed for providing a more reliable and accurate readout. That is, the weight of a particular sample may not be the same as an average weight of like pieces and by adding more samples to the sample weight and actuating a corresponding one of the switches 21 and 22, a more reliable readout is provided.

A pair of balance control knobs 27 and 28 are provided for adjusting the electrical circuitry within the control unit 11 so as to produce accurate and reliable information from the sample cell 12 and load cell 13.

For a better understanding of the electronic scale of FIGURE 1, reference is made to FIGURE 2 which shows a simplified block diagram of the electronic circuit arrangement of the electronic scale. The sample cell 12 and load cell 13 receive oscillatory signals from an oscillator 30. An output of the cells 12, 13 is indicative of a weight placed on each.

A sample amplifier 31 is connected to the sample cell 12 for receiving signal information therefrom, while a load amplifier 32 is connected to the load cell 13 for receiving signal information therefrom.

The output of the sample amplifier 31 and of the load amplifier 32 are connected to a detector and relay circuit 33. During the ratio determination of the system, the detector and relay circuit 33 senses the presence of a sample signal and energizes suitable relay means to propagate the sample signal and the load signal through the detector and relay circuit 33. The sample signal and the load signals are delivered from the detector and relay circuit 33 to a phase detector 34 through a pair of leads 36 and 37 respectively. By way of example, the lead 36 represents the sample signal, and the lead 37 represents the load signal. The sample signal and load signal are compared within the phase detector 34 and an error signal is developed therein indicative of the ratio between the weights detected by the cells 12 and 13. The output of the phase detector 34 is delivered to a servoamplifier 38 which, in turn, is used to drive a servomotor 39. An output shaft of the servomotor 39 is mechanically connected to the readout 23 to provide the desired indication.

To provide reliable operation of the electronic scale shown in FIGURE 2, a voltage regulator 40 maintains the output of the oscillator 30 at a substantially constant amplitude. However, when the input level into the amplifier 31 produces an overload at the output thereof, a feedback to the regulator 40 reduces the output voltage of the oscillator 30.

It will be appreciated that the simplified block diagram of FIGURE 2 merely sets forth the general scheme of the electronic scale, and for a better understanding of the operation of the electronic scale, reference is made to FIGURE 3. The sample cell 12 and load cell 13 in the illustrated embodiment are differential transformers, but other sensing devices may be employed, such as strain gauges. The sample cell 12 has a primary winding 46 coupled to a pair of secondary windings 47 and 48. The secondary windings 47 and 48 are of substantially the same size and number of turns, but are connected in opposition to one another. Therefore, when equal magnetic fields are developed by the secondary windings 47 and 48, there is substantially no output signal delivered at an output thereof.

A movable slug 50 is positioned between the primary winding 46 and secondary windings 47 and 48 in such a manner as to provide equal transformer coupling from the primary winding 46 to each of the secondary windings 47 and 48. The platform 14 (FIGURE 1) is connected to and displaces the slug 50 in accordance with any weight placed thereon. Therefore, displacement of the slug 50 to either side of a neutral position will vary the amount of transformer coupling to the secondary windings 47 and 48, thereby developing an output signal.

The load cell 13 has a primary winding 51 coupled to a pair of secondary windings 52 and 53. A movable slug 54 is positioned between the primary winding 51 and secondary windings 52 and 53 and is connected to the platform 16 (FIGURE 1) and movable in accordance with a load thereon. The slug 54 functions substantially in the same manner as the slug 50 of the sample cell 12. Therefore, deviation of the slug 54 on either side of a neutral position will develop an output signal at an output thereof.

A positive phase terminal 59 of the oscillator 30 is connected through resistors 57 and 58 respectively to one side of the primary windigs 46, 51. A negative phase terminal 60 of the oscillator 30 is connected to each of the other sides of the primary windings 46, 51. A variable resistor 63, and a capacitor 64 are connected across the output of the oscillator 30 so as to shunt the primary winding 46 of the sample cell 12. The slide contact of the variable resistor 63 is controlled by the balance knob 27 (FIGURE 1), and is connected to an input 65 of the amplifier 31 to provide a balance signal thereto. A variable resistor 66, and a capacitor 67 are also connected across the output of the oscillator 30 so as to shunt the primary winding 51 of the load cell 13. The slide contact of the variable resistor 66 is connected mechanically to the balance knob 28 and electrically to an input 68 of the amplifier 32 so as to provide a balancing signal thereto.

Therefore, when no parts are being sampled by the sample cell 12 and no parts are being weighed by the load cell 13, the electronic scale may be balanced by varying the resistors 63 and 66 which change the input signals to the amplifiers 31 and 32 respectively. That is, the potentiometers 63 and 66 are used to balance the input to the respective amplifiers 31, 32 to compensate for deviations of the slugs 50 and 54 when no parts are being weighed.

A capacitor network 69 consisting of capacitors 72, 73, 74, and 75 is provided to introduce a quadrature current for cancelling phase errors from the differential transformers of the sample and load cells 12 and 13. The capacitors 72 and 73 are connected together and to the input 70; the capacitors 74 and 75 are connected together and to the input 71; the capacitors 72 and 74 are connected together and to the output 59 of the oscillator 30; and the capacitors 73 and 75 are connected together and to the output 60 of the oscillator 30.

An output of the sample cell 12 is connected through a resistor 83 to the input 70 of the amplifier 31 for calibrating the input current delivered to the sample amplifier 31. Similarly, an output of the load cell 13 is connected through a resistor 84 to the input 71 of the amplifier 32 for calibrating the current of the input signal delivered to the load amplifier 32.

The detector and relay circuit 33 is shown having a double pole double throw relay, generally designated with the reference numeral 86. The relay 86 includes a pair of stationary contacts 88 and 89 disposed for alternate connection with a movable contactor 90. Also, the relay 86 includes a pair of stationary contacts 91 and 92 disposed for connection with a movable contactor 93.

In the normally quiescent condition of the relay 86, the contactor 90 engages the contact 88 and the contactor 93 engages the contact 91. In this position, one output 94 of the amplifier 31 is connected to a contact 95 of the switch 19. In the non-actuated position of the switch 19, the contact 95 is shorted to a contact 96 and the output 94 of the amplifier 31 is connected to the contact 96 of the switch 19. The contact 96 is connected to the line 37 which serves as one input to the amplifier and phase detector 34. As will be more fully appreciated hereinbelow, this input connection to the amplifier and phase detector 34 allows calibration and zeroing of the system.

Upon actuation of the relay 86, the contactor 90 engages the contact 89 which is connected to an output 97 of the load amplifier 32. Such actuation of the relay 86, therefore, connects the output 97 of the load amplifier 32 through the relay and the contacts 95 and 96 of the switch 19 to the line 37 as an input to the amplifier and phase detector 34. Upon actuation of the switch 19, the contact 95 is disconnected from the contact 96 to disconnect the output of the amplifier 31 from the input of the amplifier and phase detector 34.

The positive phase output 59 of the oscillator 30 is connected to the line 36 as another input to the amplifier and phase detector 34 when the relay 86 is in its quiescent state. Actuation of the relay 86 connects a second output 98 of the sample amplifier 31 to the input of the amplifier and phase detector 34 on the line 36. The output 94 of the sample amplifier 31 is connected to one input 99 of the detector 33. Another input 100 of the detector 33 is connected to a source of DC voltage through the switches 20, 21, and 22 in series in their non-actuated position. Actuation of any one of the switches 20, 21, and 22 removes the voltage from the input 100. If the DC voltage is removed from the input 100 and a signal is supplied to the input 99, the relay 86 will be actuated. However, if the DC voltage is not removed from the input 100 or if there is no signal supplied to the input 99, the relay 86 will not be actuated and the contactors 90, 93 will be in the positions illustrated in FIGURE 3.

The switch 17 is an on-off switch which serves to connect appropriate voltages to the respective sub-systems of the entire system. For purposes of clarity, the specific voltage supply circuits and connections are not shown or described herein.

In order for the amplifiers 31, 32 to be linear over an extended range of inputs, a maximum output is maintained in each. To maintain this maximum output, a feedback resistor 101 is connected from the output 94 to the input 70 of the amplifier 31 and a resistor 102 is connected from the output 97 to the input 68 of the amplifier 32.

As previously mentioned, actuation of the switch 18 provides an indication of the weight on the sample cell 12 at the readout 23 (FIGURE 1), preferably in grams. Actuation of the switch 18 connects a resistor 103 in parallel with the feedback resistor 101 of the amplifier 31. The resistor 103 is of a value to allow a direct readout of the weight of a sample to within a relatively small range of values, preferably to within 0.01 gram with a maximum of 20 grams.

Actuation of any one of the switches 19–21 connects a respective one of resistors 104, 105 and 106 in parallel with the resistor 102 of the amplifier 32. Actuation of the switch 19 also connects the output 97 of the amplifier 32 to the line 37 which serves as an input to the amplifier and phase detector 34 while disconnecting the output from one of the amplifiers 31, 32 on the contact 95.

The resistor 104 is of a value to allow a direct readout of the weight of a load to within a relatively large range of values, preferably to a maximum of twenty pounds. The resistor 105 is preferably of a value to change the total feedback resistance of the amplifier 32 to one-fourth that of the resistor 102; and the resistor 106 is preferably of a value to change the total feedback resistance of the amplifier 32 to one-half that of the resistor 102. Therefore, the switch 20 is a one-multiplier, the switch 21 is a two-multiplier, and the switch 22 is a four multiplier of the readout produced from a comparison of the sample output and the load output.

If any one of the switches 20, 21, or 22 is actuated to remove the DC voltage source from the input 100 and if a signal is supplied to the input 99 of the detector and relay 33, the relay 86 will be actuated and the output of the amplifier 22 will be connected to one input of the amplifier and phase detector 34 and the output 98 of the amplifier 31 will be connected to the other input. Depending upon the position of the output shaft of the motor 39, a signal will be supplied from the amplifier and phase detector 34 on one of a pair of lines 107 and 108 to the servoamplifier 38. An output of the servoamplifier 38 is connected to the motor 39.

The output of the oscillator 30 is regulated by the voltage regulator 40 connected thereto by a line 111. The voltage regulator 40 is controlled by a feedback on a line 109 and by another feedback on a line 110. When the relay 86 is in the position illustrated in FIGURE 3, the feedback on the line 109 does not affect the voltage regulator 40, since the same feedback is provided thereto on the line 110. Therefore, before actuation of the relay 86 the voltage regulator 40 is controlled entirely by the closed feedback on the line 110. When, however, the relay 86 is actuated, the output 98 of the amplifier 31 provides a feedback on the line 109 which may override the feedback on the line 110. Therefore, an overload at the output of the amplifier 31 will cause the output voltage of the regulator 40 and the output of the oscillator 30 to reduce and effect an increase in the range of the amplifiers 31, 32 which would otherwise saturate.

During the operation of the electronic scale of the present invention, as it is illustrated in FIGURE 3, the oscillator 30 produces a 7.5 volt R.M.S. signal at 2500 cycles per second. The signal from oscillator 30 is supplied to the sample cell 12 and the load cell 13, which are connected in parallel to one another. The primary windings 46 and 51 of the cells 12 and 13 respectively offer a relatively high impedance to the output of oscillator 30.

The output of the oscillator 30 is accurately controlled by the voltage regulator 40. By means provided in the feedback circuit, the larger output of either output 59 or 60 will control the voltage regulator 40.

The excitation voltage developed across the primary winding 46 is coupled to the secondary windings 47 and 48, of the sample cell 12. The secondary windings 47 and 48 are wound in opposite senses so as to produce opposing magnetic fields of substantially equal amplitude. The movable slug 50 is positioned between the primary winding 46 and secondary windings 47 and 48 such that there is substantially equal coupling from the primary winding 46 to each of the secondary windings 47 and 48. Therefore, when the slug 50 is moved relative to the secondary windings 47 and 48, the amount of transformer coupling between the primary winding and the secondary windings 47 and 48 is varied. The load cell 13 is similarly excited and adjusted.

The output of the sample cell 12 is delivered to the input 70 of the sample amplifier 31 through resistor 83. A balancing signal is delivered to the input 65 of the sample amplifier 31 from the variable potentiometer 63. The phase relationship between the inputs 65, 70 is determined by the capacitor network 69. Preferably, the phase between the two signals at the inputs 65, 70 of the sample amplifier 31 are 180° out of phase. Therefore, the signal from the sample cell 12 and the signal from the potentiometer 63 cancel one another at the input of sample amplifier 31 to effectively cause a zero input at the amplifier 31. Should the slug 50 shift to either side of a neutral position when no samples are being sensed by the sample cell 12, the deviation produced at input 70 would be counterbalanced by the input signal at the input 65.

The input terminals 68 and 71 of load amplifier 32 are connected to substantially the same type of circuit arrangement as that described in connection with the amplifier 31 and functions in substantially the same manner.

When no samples are being sensed by the sample cell 12, and no load is applied to the load cell 13, the output of both the sample amplifier 31 and the load amplifier 32 is zero. The amplifiers 31, 32 have a linear range of operation, which has a preferred maximum output in the exemplified embodiment of the present invention of four volts. If the input current to the amplifiers 31, 32 exceeds a predetermined value, the amplifiers 31, 32 are driven out of this linear range. For this reason, the feedback on line 109 is provided for reducing the output of the oscillator 30 and which serves as the excitation voltage for the cells 12 and 13 which in turn provide an input to the amplifiers 31 and 32 respectively. In operation, therefore, an operator places a sample on the sample cell 12, a load on the load cell 13, and actuates switch 20.

A readout is provided by this operation which is indicative of the ratio between the load weight and the sample weight. Since the weight of one sample way not be representative of the average weight of the like pieces constituting the load weight, multiplier factors are introduced by the switches 21 and 22 and additional samples may be placed on the sample cell 12 for obtaining an average value of the weight of the sample.

If, for instance, the switches 21 and 22 constitute a two-multiplier and a four-multiplier respectively, a change is effected in the ratio of the weights by the same factor. Therefore, if an operator has actuated switch 20 and has one sample piece on the sample cell 12 and two hundred like pieces on the load cell 13, a reading of two hundred will be obtained at the readout. By adding one more sample piece on the cell 12 and actuating the switch 21, an identical reading will be obtained. Therefore, the switches 21 and 22 insure accurate and reliable readouts by permitting the use of more than one sample piece to obtain an average weight on the sample cell 12.

Shown in FIGURE 4 is the detail construction of oscillator 30. Positive phase output 59 is connected to a tap 200 of an inductor 201. The negative phase output 60 is connected to a tap 202 of the inductor 201. Also, outputs 59, 60 are connected to the feedback line 110 through a pair of diodes 203 and 204.

The end leads of the inductor 201 are connected to a capacitor 206, while a center tap lead of the inductor 201 is connected to the ground. One of the end leads of inductor 201 adjacent the tap 200 is connected to the collector electrode of a transistor 208. Similarly, the other end of inductor 201 is connected to the collector electrode of a transistor 210. The transistors 208 and 210 have emitter electrodes respectively connected together and through a resistor 214 to the line 111 which is connected to the output of the voltage regulator 40 (FIGURE 3).

Connected between the base electrode of the transistor 208 and the tap 202 is a resistor capacitor network 217. Connected between the base electrode of the transistor 210 and the tap 200 of the inductor 201 is a resistor capacitor network 220. The resistor capacitor networks 217 and 220 provide suitable biasing for the operation of transistors 208 and 210.

When a voltage is supplied to the input of the oscillator 30 on the line 111, one of the transistors 208, 210 will be rendered conductive. By way of illustrative example, the transistor 208 may be rendered conductive before the transistor 210. Current will flow from the emitter to the base of the transistor 208 through the resistor capacitor network 217 and then through a portion 201a of the coil 201 to ground, thereby rendering a transistor 208 highly conductive. Thereupon, a current will flow through the emitter collector junction of transistor 208 through winding portions 201b and 201c of the coils 201 to ground. The conduction of transistor 208 applies a positive potential to the base of transistor 210 thereby maintaining transistor 210 substantially non-conductive.

As the current to transistor 208 begins to decrease, the voltage developed across winding 201a causes the tap 202 to become positive, thereby aiding in rendering the transistor 208 non-conductive. The decreasing current of transistor 208 also causes the tap 200 to become negative, thereby rendering the transistor 210 conductive.

As the transistor 210 becomes conductive, it applies current through windings 201a and 201b and the tap 202 becomes positive to cause transistor 208 to become non-conductive.

The operation of oscillator 30 continues to render transistors 208 and 210 alternately conductive and non-conductive thereby producing an AC output signal between outputs 59, 60.

The AC signal developed between outputs 59, 60 is rectified by diodes 203 and 204 to deliver a feedback signal to the voltage regulator 40 via the line 110. As mentioned hereinabove, line 110 is connected to the voltage regulator 40, which, in turn, controls the amplitude of the output of the oscillator 30 by varying the input voltage at the input on the line 111.

Illustrated in FIGURE 5 is the detail construction of the voltage regulator 40. The voltage regulator 40 has an input terminal 300 connected to a source of DC voltage. By way of example, the source DC voltage is 18 volts. The output of the voltage regulator 40 is delivered to the line 111 which is connected to the input of the oscillator 30 (FIGURE 3). The output voltage of the voltage regulator 40 varies between 12 and 16 volts. Furthermore, the output current of the voltage regulator 40 can vary between 20 and 60 milliamps.

The source of DC voltage on the terminal 300 is connected through three circuit branches in parallel with one another to the line 111 which serves as an output of the voltage regulator 40. The first circuit branch includes a resistor 301; the second circuit branch includes a transistor 302; and the third circuit branch includes a resistor 303 connected in series with a transistor 304. When the transistors 302 and 304 are rendered non-conductive, the source of DC voltage on the terminal 300 is connected to line 111 only through the resistor 301 to provide a relatively small output voltage on the line 111. When the transistor 304 is rendered conductive, the terminal 300 is connected to the line 111 through the resistors 301 and 303 in parallel with one another. Rendering of the transistor 304 conductive, therefore, increases the voltage on the line 111. When the transistor 302 is rendered fully conductive, the terminal 300 is connected directly through the transistor 302 to the line 111.

The base electrode of the transistor 302 is connected to the emitter electrode of the transistor 304 so that the conduction level of the transistor 302 is controlled in accordance with the potential on the emitter of the transistor 304.

The conduction level of the transistor 304 is controlled by a transistor 306. The collector electrode of the transistor 306 is connected to the base of the transistor 304 and through a resistor 307 to the DC voltage source on the terminal 300. The emitter of the transistor 306 is connected through a resistor 309 to a ground potential. The base electrode of the transistor 306 is connected to the variable contact of a potentiometer 310, which potentiometer is connected in parallel with Zener diode 311. One end of the potentiometer 310 is connected through a resistor 308 to the DC voltage source on the terminal 300 and the other end thereof is connected to ground potential. The Zener diode 311 is a temperature compensating reference diode having, by way of example, a temperature range of −55 to +100 degrees C. Furthermore, the reference diode 311 preferably has a reference voltage of 6.2 volts. The voltage level of the regulator 40 is adjustable and controllable by the variable contact of the potentiometer 310 by controlling the conduction level of the transistor 306.

The conduction level of the transistor 306 is also controlled by a transistor 312 having its collector connected to the source of DC voltage on the terminal 300 and its emitter electrode connected through the resistor 309 to ground potential. The base of the transistor 312 is connected to the feedback line 110 (FIGURE 3) and to the feedback line 109 through a diode 313. The output line 111 is connected through a capacitor 314 to ground potential and through a capacitor 316 to the base electrode of the transistor 312. The base of the transistor 312 is also connected through a resistor 317 to ground potential. The large one of the feedback signals on either of the lines 109, 110 charges the capacitor 316 to alter the conduction level of the transistor 312. In this manner, the output voltage on the line 111 is controlled by the large one of the feedback signals on the lines 109, 110.

In operation, a source of DC potential is applied to the terminal 300, which is delivered to the potentiometer 310 through the resistor 312. The reference diode 311 maintains the voltage drop across the potentiometer at a constant value. Therefore, the conductivity of the transistor 306 is selectively adjusted by the potentiometer 310.

Without any feedback signals on the lines 109, 110, the transistor 312 is non-conductive and the voltage drop across the resistor 309 is primarily determined by the current through the transistor 306. The conductivity of the transistor 306 is sensed by the base electrode of the transistor 304 to control the conductivity level of the transistor 304. Similarly, the conductivity of the transistor 304 is sensed by the base electrode of the transistor 302 to control the conduction level of the transistor 302. Therefore, the output voltage on the line 111 will remain essentially constant if the transistor 312 is maintained non-conductive.

However, when feedback signals are supplied to the base of the transistor 312 through the lines 109, 110, the output voltage on the line 111 of the voltage regulator 40 will be varied in accordance with the larger one of those feedback signals. If the transistor 312 is rendered conductive, the voltage drop across the resistor 309 will be increased to decrease the conduction level of the transistor 306.

Therefore, maximum output voltage is obtained on the line 111 when the transistor 302 is rendered fully conductive. As the conduction level of the transistor 302 is reduced, a voltage drop is produced across the resistors 301, 303 which reduces the output voltage on the line 111. When the transistor 304 is rendered non-conductive, a maximum voltage drop is produced across the resistor 301 to decrease the output voltage on the line 111 to its lowest point.

When the relay 86 is in the non-actuated position, as illustrated in FIGURE 3, the feedback signal on the line 109 is not larger than the feedback signal on the line 110, since they are both the same signal. The signal on the line 110 is a full wave rectified output of the oscillator 30 (FIGURE 4). When the output of the oscillator 30 is loaded, the feedback signal on the line 110 alters the conduction level of the transistor 312 to compensate for such change by altering the output of the voltage regulator 40 on the line 111.

When the relay 86 is actuated, however, an output of the amplifier 31 is supplied on the line 109 and through the diode 313 to the base of the transistor 312. This additional feedback signal controls the output voltage of the regulator 40 on the line 111 in accordance with an output from the amplifier 31. In this manner, the voltage regulator 40 controls the output voltage of the oscillator 30 and reduces it on overloads of the amplifier 31 so as to effectively increase the range of the amplifiers 31, 32 which would otherwise saturate.

Seen in FIGURE 6 is the detailed schematic wiring diagram of the sample amplifier 31. It will be understood that the construction of the load amplifier 32 is substantially the same as sample amplifier 31.

As mentioned hereinabove, input signals are delivered to input terminals 65 and 70. A resistor 400 is a current limiting resistor for the signal supplied to the terminal 65. The input signals are developed across a resistor 401, which is connected between the input terminal 70 and ground.

The signal developed across resistor 401 is fed through a coupling capacitor 408 to the base electrode of a transistor 410. A resistor 411 is connected between ground and the base of transistor 410, and a resistor 412 is connected between the base of the transistor 410 and a source of positive potential at a circuit point 413. Resistors 411 and 412 form a voltage divider network which biases transistor 410 as a class A amplifier.

The output signal of transistor 410 is developed across a resistor 414, which is connected between ground and the collector electrode of transistor 410. An emitter resistor 416 is connected between the emitter of transistor 410 and the circuit point 413. A capacitor 417 is connected between ground and the emitter electrode of transistor 410 and cooperates with resistor 416 to further bias the transistor 410 as a class A amplifier.

A filter capacitor 420 is connected between circuit point 413 and ground for filtering undesired transients which may inadvertently be developed within the power supply of the electronic scale. A voltage dropping resistor 421 is connected in series between circuit point 413 and a source of DC voltage at a terminal 418.

The output of transistor 410 is direct current coupled to the base electrode of a transistor 422. Transistor 422 serves to further amplify the signal and to develop two output signals from the single input signal. One of the output signals is developed across a resistor 423 which is connected between the collector electrode of transistor 422 and ground. The other signal is developed across a resistor 424, which is connected between the emitter of transistor 422 and the source of positive potential at the terminal 418. The output signals developed across the resistors 423 and 424 are delivered through coupling capacitors 426 and 427 respectively.

Connected to the emitter electrode of the transistor 422 is a resistor 428 which, in turn, is connected in series with a capacitor 429 to ground.

The value of resistor 428 is selected so that a predetermined portion of the signal which is developed across resistor 424 is passed to ground. The AC ground path through resistor 428 and capacitor 429 serves to limit the amount of signal which passes through capacitor 427 to effect the overall gain of the amplifier 31. Also, the value of capacitor 427 is selected to deliver to the following amplifier stage, a predetermined portion of the signal developed across resistor 424. The signal through capacitor 427 is delivered to the collector of a transistor 430 to oppose the output signal therefrom. The capacitor 427 may also be thought of as a degenerative feedback capacitor which reduces the gain of transistor 422.

A voltage divider network consisting of a resistor 431 and 432 is connected between ground and the DC voltage source at the terminal 418. The resistors 431 and 432 are connected to the base of a transistor 430 to bias as a class A amplifier. An emitter resistor 434 and a bypass capacitor 436 are connected to the emitter of transistor 430.

The collector of transistor 430 is connected to the output terminal 94 and to a tank circuit 437. The inductor of tank circuit 437 consists of a primary winding 438 of a transformer 439. The tank circuit 437 is preferably resonant at 2500 cycles per second to serve as a high output impedance for transistor 430 at the operating frequency.

A secondary winding 440, of transformer 439, is connected to the output terminal 98. It will be noted that the output signal from secondary winding 440 is used only from the sample amplifier 31, and not from the load amplifier 32.

Each of the amplifiers 31, 32 includes feedback resistors 101, 102, as illustrated in FIGURE 3. The amplifier 31, illustrated in FIGURE 6, includes the feedback resistor 101 connected in series with a calibrating resistor 101a between the output 94 and the input 70. The feedback path of amplifier 32 including the feedback resistor 102 is similar to that of the amplifier 31. The total feedback resistance is selected so that within a predetermined range of input currents at the terminal 70, a predetermined maximum voltage is obtained at the output 94. In the exemplified form of the present invention, this maximum is 4 volts.

As previously described in conjunction with FIGURE 3, actuation of any one of the switches 18–21 changes the resistance of this feedback path in one of the amplifiers 31, 32. This change in the feedback resistance is required in the present exemplification of the invention to maintain the gain factor for correct computation fixed. That is, when the input current at the terminal 70 increases with increased loads on the sample cell 12, the gain of the amplifier 31 is changed by changing the resistance of the feedback path. Also, as previously mentioned, the effective range is extended by the feedback to the voltage regulator 40.

In operation, when no samples are being sensed by the sample cell 12 (FIGURE 3), the signal developed at the terminal 70 is zero. Therefore, no output signal will be derived at terminals 94 and 98, of the sample amplifier 31. However, should a sample be sensed by the sample cell 12, an input signal will be developed at the terminal 70 which, in turn, is passed through the coupling capacitor 408 and amplified by the transistor 410.

The amplified signal from the transistor 410 is direct current coupled to the transistor 422 where the signal is further amplified. Furthermore, the transistor 422 develops a pair of output signals. One of the output signals is developed across the resistor 423, while the other output signal is developed across the resistor 424.

The signal developed across the resistor 423 passes through the capacitor 426 to the base of the transistor 430. The signal is further amplified by the transistor 430 and developed across the tank circuit 437. A portion of the output signal from the transistor 430 is fed back to the input terminal 70 through the feedback resistors 101, 101a. The feedback network is calibrated to provide a substantially constant ratio between the input current at terminal 70 and the output voltage at terminal 94. That is, a constant gain is achieved by the amplifiers 31, 32 over a certain range of input signals.

A predetermined portion of the signal developed across resistor 424 is passed to ground through resistor 428 and capacitor 429 to ground potential. The remaining portion of the signal developed by resistor 424 is applied to the collector of transistor 430 through capacitor 427. The signal delivered through capacitor 427 serves to oppose the signal developed at the output of transistor 430. The signal from transistor 430 is developed across the parallel resonant tank circuit 437 which is formed by using the primary winding 438 of the transformer 439. By using the tank circuit 437 and the secondary winding 440, a pair of output signals are developed at terminals 94 and 98 of the sample amplifier 31.

Shown in FIGURE 7 is a schematic diagram of the detector and relay circuit 33. The detector and relay circuit 33 is basically an AND logic circuit. Specifically, the positive DC voltage at the terminal 100 must be removed therefrom and a positive voltage must be applied to the terminal 99 before the relay 86 will be actuated. However, if a positive voltage is applied to the terminal 99 while the positive DC voltage is still applied to terminal 100, the relay 86 will not be actuated. Furthermore, if the positive voltage is removed from the terminal 100 and no positive voltage is applied to the terminal 99, the relay 86 will not be actuated.

A relay coil 500 of the relay 86 has one lead thereof connected to ground and the other lead thereof connected to a positive DC potential source through a transistor 501. When transistor 501 is rendered conductive, the relay coil 500 is energized thereby actuating the relay contacts 90, 93 associated therewith. A diode 502 is connected in parallel with the relay coil 500 to suppress transients which would occur upon deenergization of the relay coil.

The conduction of transistor 501 is controlled by a transistor 503. The base of transistor 503 is connected through a resistor 504 to ground potential and a capacitor 505 in parallel with the resistor 504 which, in combination, serve as a charging circuit to control the operation of transistor 503. The base of transistor 503 is also connected through a diode 507 to the input terminal 99. Diode 507 allows signal information to be fed to the capacitor resistor charging circuit and prevents discharge thereof by virtue of the high reverse impedance of the diode 507.

Connected between the collector of transistor 503 and a source of DC potential is a resistor 508 and a capacitor 509 in parallel with one another. The resistor 508 and capacitor 509 serve to filter the signal developed at the output of transistor 503 thereby applying a substantially constant bias voltage to the base of transistor 501.

A resistor 510 is connected between the emitter of transistor 503 through a portion of a potentiometer 511 and ground potential. Preferably, the value of resistor 510 is substantially the same as resistor 508, and the balancing potentiometer 511 is used to control the operation of transistor 503 as will be described in greater detail hereinbelow.

Also connected to the potentiometer 511 is the emitter of a transistor 512. Transistor 512 serves to apply a reverse bias to the emitter of transistor 503 when a positive potential is applied to the terminal 100. The collector of transistor 512 is connected to a source of positive DC potential and when transistor 512 is rendered conductive the positive potential is sensed at the emitter of transistor 503 through the potentiometer 511.

The positive potential at the terminal 100 is developed across a resistor 513 and a resistor 514 to ground potential. Intermediate resistors 513 and 514 is a circuit point 516 which is connected to the base of transistor 512. Connected between the circuit point 516 and ground potential is a capacitor 517.

In operation, transistor 501 is substantially non-conductive thereby maintaining the relay 86 in a non-actuated state. When a positve potential is applied to the terminal 100, transistor 502 is rendered conductive, thereby applying a positive potential at the emitter of transistor 503. By way of example, if the collector of transistor 512 is connected to a 12 volt positive potential, and transistor 512 is rendered conductive, the voltage developed at the emitter of transistor 503 will be approximately between 9 and 10½ volts, depending upon the position of the movable contact of potentiometer 511. Therefore, if a positive signal is delivered to the base of transistor 503 it will have substantially no effect on the transistor 503 since the emitter thereof is reverse biased.

When the positive potential is removed from the terminal 100, the transistor 512 is rendered non-conductive, thereby placing the emitter of the transistor 503 at ground potential through the resistor 510. Therefore, when the base of transistor 503 becomes positive, by charging capacitor 505, the transistor will conduct. This causes the base of the transistor 501 to become negative with respect to the emitter thereof, thereby rendering the transistor 501 conductive. As mentioned hereinabove, the conduction of transistor 501 causes the relay coil 500 to become energized to actuate the contacts 90 and 93 associated therewith.

Figure 8:
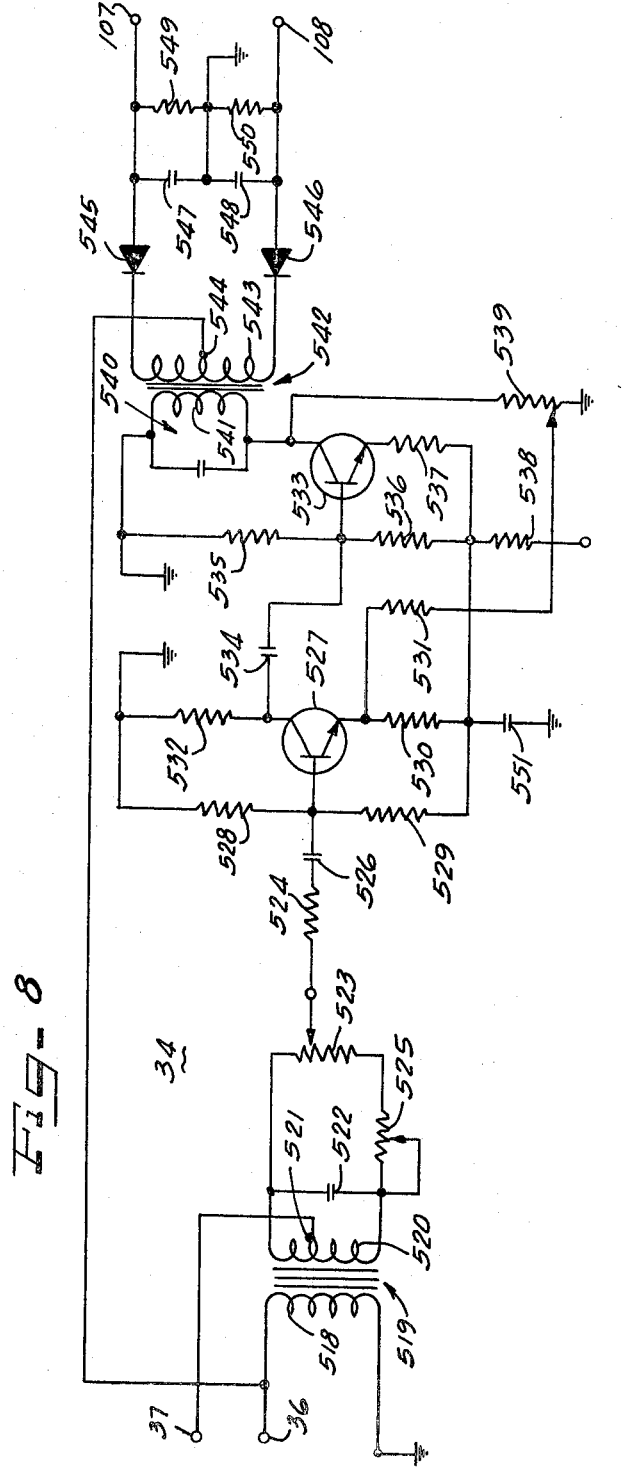
FIGURE 8 is a schematic diagram of a summer circuit and amplifier and phase detector circuit which form a part of the block diagram of FIGURE 3.

Shown in FIGURE 8 is a schematic diagram of the phase detector 34, reference signal is applied to a primary winding 518 of a transformer 519 through the input terminal 36. The transformer 519 is a phasing transformer and includes a secondary winding 520 wound in phase opposition to the winding 518. That is, a positive signal at the upper end of the primary winding 518 will cause a positive signal to be developed at the lower end of the secondary winding 520, as shown in FIGURE 8.

A second input signal is applied to the secondary winding 520 at a tap 521 from the input terminal 37. A phasing capacitor 522 is connected in parallel with the secondary winding 520. The phasing capacitor 522 serves to shift the phase of the composite signal developed in the secondary winding 520 so that the signal developed by the following amplifier stages is of the proper phase.

Also connected in parallel with the secondary winding 520 is a potentiometer 523. The movable contact arm of potentiometer 523 is connected to an input resistor 524 for delivering the signal developed across potentiometer 523 to the following amplifier stages. A calibrating resistor 525 is connected in series with potentiometer 523, as shown in FIGURE 8.

The signal developed at potentiometer 523 is delivered through a coupling capacitor 526 to the base of a transistor 527. A pair of resistors 528 and 529 serve to bias transistor 527 as a class A amplifier. The base of the transistor 527 is connected through the resistor 529 and a resistor 538 to a source of DC potential. The base of the transistor 527 is connected through the resistor 528 to ground potential. The emitter of transistor 527 is connected through a resistor 530 and the resistor 538 to the source of DC potential. A resistor 531 connects the emitter of the transistor 527 to a movable contact on a gain adjusting potentiometer 539, which is connected to ground at one end thereof. The output of transistor 527 is developed across a resistor 532 and delivered to the base of a transistor 533 through a coupling capacitor 534.

A pair of resistors 535 and 536 are connected to the base of transistor 533 to bias the transistor 533 as a class A amplifier. Connected to the emitter of transistor 533 is a resistor 537 which, in turn, is connected to the resistor 538.

The output of transistor 533 is developed across a resonant tank circuit 540. The inductance of the resonant circuit 540 forms a primary winding 541 of a transformer 542. A secondary winding 543 of the transformer 542 has a center tap 544 which is connected to the input terminal 36.

A signal developed across the secondary winding 543 is induced therein by the primary winding 541 and added thereto is the input signal from the terminal 36 applied to the center tap 544. The total signal is rectified by a pair of diodes 545 and 546. The rectified signal through diode 545 charges a capacitor 547 to develop a positive voltage at the output terminal 107. In shunt with the capacitor 547 is a resistor 549.

The diode 546 function in substantially the same manner as diode 545. The rectified signal through diode 546 is filtered and stored in a capacitor 548, thereby applying a positive potential at output terminal 108. Shunting capacitor 548 is a resistor 550. By way of illustrative example, resistors 549 and 550 are preferably the same value and the junction between each is connected to ground potential. This provides a balance between the signal developed from the terminal 107 to ground and the signal developed from the terminal 108 to ground.

The output of transistor 533 is also applied to the potentiometer 539 which, in turn, has the other end thereof connected to ground. The movable contact of potentiometer 539 is connected through the resistor 531 to the emitter of transistor 527. The feedback circuit from the output of transistor 533 to the emitter of transistor 527 serves as a variable gain control. A filter capacitor 551 is connected between the positive potential developed at one end of the resistors 529, 530, 536, 537 and ground. The capacitor 551 serves as an AC ground for the signal developed at the potentiometer 523.

In operation, a reference signal voltage is delivered to the terminal 36 where it is transformer coupled to the secondary winding of the transformer 519. The reference signal is developed across the potentiometer 523 in a predetermined phase relation. A second signal is applied to the terminal 37 where it is delivered to the tap 521 on the secondary winding of transformer 519. The second signal is also of a predetermined phase relation. The two signals developed across the secondary winding of transformer 519 are substantially 180° out of phase. Therefore, signals of opposite senses are developed across potentiometer 523 and delivered to the input circuit of transistor 527.

The ground path for signals developed across potentiometer 523 is through the resistor 524, capacitor 526, resistor 529 and capacitor 551. Therefore, current flows through the upper portion of potentiometer 523 through the ground path to ground potential and through the lower portion of potentiometer 523 through the ground path to ground potential. This causes the secondary winding of transformer 519 and its associated circuitry to appear as a bridge circuit. Therefore, there exists on the potentiometer 523 a point at which the movable contact senses a zero output voltage from the secondary winding 520 of transformer 519. The movable contactor of potentiometer 523 is driven by the motor 39 which drives the readout 23. Therefore, a closed loop exists between the potentiometer 523, the servoamplifier 38, and the motor 39 which drives the readout 23 to move the movable contactor of potentiometer 523 to a null point.

When the movable contact of potentiometer 523 is positioned to sense an output signal, the signal is delivered to the input of transistor 527. Transistor 527 amplifies the signal and delivers the amplified signal to the input of transistor 533 which, in turn, further amplifies the signal and develops it across the resonant tank circuit 540.

As mentioned hereinabove, the reference voltage delivered to the center tap 544 of transformer 542 develops two signals of equal polarity and of substantially equal amplitude at output terminals 107 and 108. Therefore, with no signal applied to the input of the transistor 517, the difference of potential between terminals 107 and 108 is substantially zero. However, should a signal be transformer coupled to the secondary winding 543, the signal will be developed across the entire secondary winding. This signal is rectified by either the diode 545 or 546 and delivered to the corresponding output terminals, to cause a difference of potential between terminals 107 and 108. The difference of potential between terminals 107 and 108 is then delivered to the servoamplifier circuit 38, of FIGURE 2.

Shown in FIGURE 9 is a schematic diagram of the servoamplifier 38. The input terminals 107 and 108 are the same circuit points as the output terminals 107 and 108 of the amplifier detector circuit 34. The difference of potential applied to input terminals 107 and 108 is developed across a pair of resistors 600 and 601, and a pair of capacitors 602 and 603, respectively.

The signal developed at capacitor 602 is delivered to the base of a transistor 604 through a resistor 606. Similarly, the signal developed at capacitor 603 is delivered to the base of a transistor 607 through a resistor 608. The emitters of transistors 604 and 607 are connected together through a balancing potentiometer 609, which serves to balance the operation of the two transistors so that the circuit characteristics are substantially the same. A resistor 610 has one end thereof connected to the movable contact of the potentiometer 609 and the other end thereof connected to ground potential. A resistor 611 is connected between the collector of transistor 604 and a source of positive DC potential to develop the amplified signal therefrom. Similarly, a resistor 612 is connected between the collector of transistor 607 and a source of positive DC potential to develop the signal therefrom.

The output of transistor 604 is applied to one side of a capacitor 613, and the output of transistor 607 is applied to the other side of the capacitor 613. The signal from transistor 604 is direct current coupled to the base of a transistor 616. The output signal from transistor 607 is direct current coupled to the base of a transistor 617. The emitters of transistors 616 and 617 are connected together through a line 618. Line 618 is connected to a source of positive DC potential through a resistor 619. Also connected to the line 618 is a pair of resistors 620 and 621 which are connected to the motor 39 (FIGURE 3).

The signal from transistor 616 is developed across a resistor 622 and direct current coupled to the base of a transistor 623. Similarly, the signal through transistor 617 is developed across a resistor 624 and direct current coupled to the base of a transistor 625.

The emitter electrodes of transistors 623 and 625 are connected together through a pair of resistors 627 and 628. Also connected between the emitters of transistors 623 and 625, and shunting the resistors 627 and 628 is a fixed resistor 630 connected in series with a variable resistor 631. Variable resistor 631 serves to stabilize the operation of the servoamplifier 38.

A diode 633 is connected between the collector of transistor 632 and the emitter of a transistor 634. The base of transistor 634 is connected directly to the collector of transistor 623 and through a resistor 636 to a source of positive DC potential. Connected to the collector of transistor 634 is a resistor 637 which, in turn, is connected to the source of positive DC potential. Also connected to the collector of transistor 634 is a resistor 638 which is connected to a circuit point 639. A resistor 640 has one end thereof connected to a circuit point 639 and the other end thereof connected to the emitter of the transistor 634 and to one end of the resistor 620. A resistor 642 has one end thereof connected to circuit point 639 and the other end thereof connected to the emitter of transistor 623.

A diode 643 is connected between the collector of transistor 625 and the emitter of a transistor 644. The base of transistor 644 is also connected to the collector of transistor 625 and to a resistor 646. The transistor 644 has one collector thereof connected to a source of positive DC potential through a resistor 647.

Also connected to the collector of transistor 644 is a resistor 648 which, in turn, is connected to a circuit point 649. Also connected to circuit point 649 is one end of a resistor 650. The other end of resistor 650 is connected to the emitter of transistor 644. A resistor 652 has one end thereof connected to the circuit point 649 and the other end thereof connected to the emitter of transistor 625.

The servoamplifier 38 is energized by either of a pair of switches 656 or 657 connected in parallel with one another and from the junction of resistors 627, 628 to ground potential. Switch 656 is preferably a momentary contact switch and switch 657 is a continuously actuated on-off switch. When either of the switches 656 or 657 is closed, the ground potential is applied to the emitters of transistors 623 and 625.

In operation a difference of potential must exist between the input terminals 107 and 108, and one of the switches 656 or 657 must be closed before the servoamplifier 38 is energized. By way of example, when the terminal 107 is positive with respect to the terminal 108, the transistor 604 is rendered conductive thereby turning on the transistor 616. This causes the transistor 623 to become conductive thereby causing the emitter of transistor 634 to become negative with respect to the emitter of transistor 644. Therefore, current will flow through the servomotor 39 in the direction indicated by the arrow 39a. That is, current will flow from the source of positive potential through resistor 647, transistor 644, motor 39, diode 633, transistor 623, resistor 627, and one of the switches 656 or 657 to ground.

On the other hand, should terminal 108 become positive with respect to terminal 107, the transistor 607 will be rendered conductive. This causes the transistor 617 to be turned on which, in turn, renders the transistor 625 conductive. It will be understood that transistor 623 is non-conductive.

The conduction of transistor 625 causes the emitter of transistor 644 to become negative with respect to the emitter of transistor 634. Therefore, current will flow through the servomotor 39 in the direction indicated by arrow 39b. That is, current will flow from a source of positive potential through resistor 637, transistor 634, motor 39, transistor 625, resistor 628, and through one of the switches 656 or 657 to ground.

Therefore, when a difference of potential is applied between input terminals 107 and 108 of the servoamplifier, the servomotor 39 will be energized to rotate in a given direction when one of the switches 656 or 657 is closed. By reversing the polarity of the potential applied between terminals 107 and 108, the servomotor 39 is energized in the opposite direction.

Figure 10:
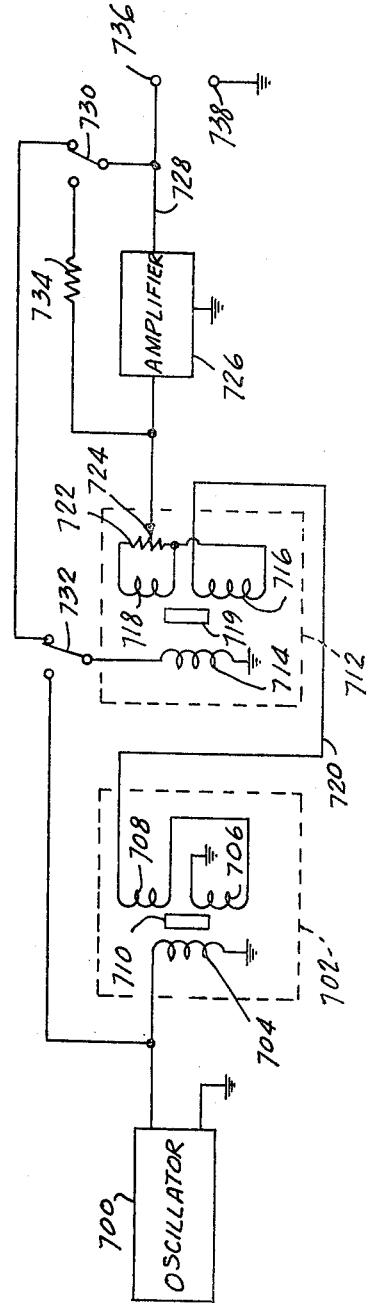
FIGURE 10 is a block diagram of another embodiment of an electronic scale constructed in accordance with the principles of the present invention which may be employed with a direct readout or with a computing system.

FIGURE 10 illustrates another embodiment of the present invention which provides a ratio between two weights. The output of an oscillator 700 is connected to the input of a load cell 702. The oscillator 700 may be similar to that illustrated in FIGURE 4 or may be any conventional oscillator well known in the art. Furthermore, the oscillator 700 may include means for regulating the output voltage thereof, such as the voltage regulator 40 illustrated in FIGURE 5.

The load cell 702 includes a primary winding 704 connected across the output of the oscillator 700, a pair of secondary windings 706 and 708, and a movable slug 710. The secondary windings 706 and 708 are of substantially the same size and number of turns, but are connected in opposition to one another. Therefore, when equal magnetic fields are developed by the secondary windings 706 and 708, there is substantially no output signal delivered at an output thereof.

The movable slug 710 is positioned between the primary winding 704 and the secondary windings 706 and 708 in such a manner as to provide equal transformer coupling from the primary winding 704 to each of the secondary windings 706 and 708. The slug 710 is adapted for connection to a platform, such as the platform 16 (FIGURE 1), such that the slug 710 is displaced in accordance with any weight placed thereon. Therefore, displacement of the slug 710 to either side of a neutral position will vary the amount of transformer coupling to the secondary windings 706 and 708, thereby developing an output signal from the load cell 702.

A sample cell 712 includes a primary winding 714, a pair of secondary windings 716 and 718, and a movable slug 719. The sample cell 712 is similar to the load cell 702 in that the secondary windings 716 and 718 are also of substantially the same size and number of turns and are connected in opposition to one another. Therefore, the load cell 712 does not produce an output signal when equal magnetic fields are developed in the secondary windings 716 and 718 thereof.

The movable slug 719 is positioned between the primary winding 714 and the secondary windings 716 and 718 in such a manner as to provide equal transformer coupling therebetween. The slug 719 is also adapted for supporting a platform, such as the platform 14 (FIGURE 1), such that it will be displaced in accordance with any weight placed thereon. Therefore, displacement of the slug 719 to either side of a neutral position will vary the amount of transformer coupling to the secondary windings 716 and 718, thereby developing an output signal from the sample cell 712.

An output from the load cell 702 is connected by a line 720 to one end of the secondary winding 716 of the sample cell 712. Therefore, the output of the load cell 702 is added to the voltage induced in the secondary windings 716 and 718 from the primary winding 714.

A potentiometer 722 is connected across the secondary winding 718 and provides an output from the sample cell 712 on a slide arm 724 thereof. The slide arm 724 is connected to the input of an amplifier 726, which may be identical to the amplifier illustrated in FIGURE 6 or may be any operational amplifier having a relatively high gain. An output of the amplifier 726 on a line 728 is connected to the movable contact arm of a switch 730. A fixed contact of the switch 730 is connected to one fixed contact of a switch 732, which switch 732 has a movable contactor connected to one side of the primary winding 714 of the sample cell 712. Therefore, when the switches 730 and 732 are actuated to the position shown in FIGURE 10, an output of the amplifier 726 is connected across the primary winding 714.

The switches 730 and 732 may be actuated to the positions illustrated in FIGURE 10 by movement of one or both of the platforms to which the slugs 710 and 719 are connected. Therefore, when there is no weight being supported by the slugs 710 and 719, the switches 730 and 732 will be in the opposite position to that illustrated in FIGURE 10. In the non-actuated position of switches 730 and 732, the circuit may be either calibrated for zero output or may be employed for weighing an item or items placed on either one of the cells 702 or 712. The function of the circuit when the switches 730 and 732 are in their non-actuated position will be explained in greater detail hereinbelow.

When the switches 730 and 732 are in their respective positions as illustrated in FIGURE 10, the output of the amplifier 726 is supplied to the input of the sample cell 712 and the output of the load cell 702 is added to the voltage induced in the secondary windings 716 and 718 of the load cell 712. The total of the induced voltage and the voltage output from the load cell 702 is supplied as an input to the amplifier 726. In effect, therefore, a feedback is provided for the amplifier 726 from the output to the input thereof through the sample cell 712.

Since the amplifier 726 is a relatively high gain device, the output thereof on the line 728 will change with any deviation at an input thereof from zero. Therefore, the output of the amplifier 726 will stabilize when the input thereto (formed in part by the output of the amplifier) is reduced toward zero.

The output voltage of the cells 702 and 712 may be expressed by:

$$E = KWE_I \quad (1)$$

where,

K is a constant associated with the cells 702 and 712;
W is the weight supported by the cell; and
$E_I$ is the input or excitation voltage for the cell.

Since the excitation voltage of the load cell 702 is the output voltage of the oscillator 700, and since the excitation voltage for the sample cell 712 is the output voltage of the amplifier, the total input voltage applied to the amplifier 726 is:

$$E_A = KW_L E_I + KW_S E_O \quad (2)$$

where, $W_L$ is the weight supported by the load cell 702;
$W_S$ is the weight supported by the sample cell 712;
$E_I$ is the output voltage of the oscillator 700 applied to the input of the load cell 702; and
$E_O$ is the amplifier 726 output voltage.

Since the input to the amplifier 726 must be driven to zero before equilibrium is obtained, then:

$$E_A = 0 \quad (3)$$

and, $$E_O = E_I \frac{W_L}{W_S} \quad (4)$$

Since $E_I$ is a constant voltage, the amplifier output is a function of the ratio between $W_L$ and $W_S$.

The output of amplifier 726 developed across terminals 736 and 738 may be connected to any readout device for providing a visual indication of the ratio of the respective weights on the cells 702 and 712, which readout device may be one which is well known in the art. The output across terminals 736 and 738 may also be connected to a computer for inserting the information of the ratio between the weight supported on the cells 702 and 712 for inventory purposes.

In order to zero the circuit illustrated in FIGURE 10, the switch 730 may be actuated to the opposite position from that shown, while the switching 732 remains in the position illustrated in the drawing. Such actuation of the switch 730 places a resistor 734 between the input and the output of the amplifier 726 to provide a feedback path therefor. During such condition of the switches 730 and 732, the primary winding 714 of the sample cell 712 is not excited and the only input supplied to the amplifier 726 is the output voltage of the load cell 702. Therefore, the load cell 702 may be adjusted to provide a zero output from the amplifier 726. Subsequent to such zeroing operation, the switch 732 may be actuated to the opposite position from that shown in the drawing so as to connect the output of the oscillator 700 to the primary winding 714 thereof and allow adjustment of the sample cell 712.

After the cells 702 and 712 have been adjusted to provide a zero calibration of the circuit, the weight of an item may be read directly from the output of the amplifier in either position of the switches 730 and 732.

The potentiometer 722 is fixed at a particular position, depending upon the number of sample pieces being supported on the sample cell 712. Therefore, adjustment of the potentiometer 722 is required if more than one sample piece is employed in the determination of the weight ratio. That is, if two sample pieces are employed in the weight determination, the potentiometer 722 is moved to a position to provide one-half the voltage developed across the secondary winding 718 to the input of the amplifier 726. In this manner, an average weight of the total samples being sensed is obtained in the resultant weight ratio.

It is to be understood that some portions of the circuit illustrated in FIGURE 10 may be operated by direct current apparatus. For instance, the amplifier 726 may be a DC amplifier having an AC to DC converter at the input thereof. Furthermore, the entire circuit may be operated in a DC mode, if the cells 702 and 712 are of a DC character, such as strain gauge elements in a bridge circuit.

The load cells 12, 13, 702 and 712 may be any load cell well known in the art. Preferably, however, the load cells are of the type disclosed in the copending application to George H. Fathauer, Ser. No. 428,304, filed Jan. 27, 1965, now United States Patent 3,301,341, issued Jan. 31, 1967. This particular load cell senses deflection between a stationary wall and a weight supporting wall, which deflection is caused by the weight. The windings of the differential transformer are mounted on one of the walls and the core of the transformer is mounted on the other wall. The differential transformer in such a load cell does not contribute to the weight supporting capabilities of the load cell.

The load cells 12, 13, 702 and 712 may also constitute a bridge circuit having a strain gauge in one leg thereof, which is secured to a compressible member adapted for receiving the weight of the sample or load thereon. Furthermore, it is to be understood that DC excitation voltages may be employed with appropriate changes to the remaining elements of the circuits, as is well known in the art.

What is claimed is:

1. An electronic scale comprising a pair of load cells each having an output proportional to the amount of weight supported thereon, a source of voltage connected to said load cells and having a plurality of outputs, means for comparing one of said load cell outputs with one of an output of said source of voltage and the output of the other of said load cells and having an output proportional to a difference between each, and a readout connected to said comparing means and responsive to an output therefrom to provide a numerical indication of the weight on said one load cell, first switching means for switching one of said voltage source outputs and said other load cell output to said comparing means for allowing comparison of the output of said one load cell with the output of said other load cell, and a sample amplifier connected between said one load cell and said comparing means and a load amplifier connected between said other load cell and said first switching means, each of said amplifiers having a constant gain over a predetermined range of input current, said load amplifier including a feedback loop, a plurality of resistances, and second switching means for selectively connecting said plurality of resistances in said feedback loop in accordance with input current.

2. An electronic scale comprising a pair of load cells each having an output proportional to the amount of weight supported thereon, a source of voltage connected to said load cells and having a plurality of outputs, means for comparing one of said load cell outputs with one of an output of said source of voltage and the output of the other of said load cells and having an output proportional to a difference between each, and a readout connected to said comparing means and responsive to an output therefrom to provide a numerical indication of the weight on said one load cell, means for switching one of said voltage source outputs and said other load cell output to said comparing means for allowing comparison of the output to said one load cell with the output of said other load cell, said switching means including an "AND" circuit having one input connected to an output of said sample amplifier, a plurality of switches, at least one of said switches connecting another input of said "AND" circuit to a source of constant potential, a relay connected to an output of said "AND" circuit and including means for connecting one of said voltage source outputs and the output of said other load cell to said comparing means.

3. An electronic scale comprising a pair of load cells each having an output proportional to the amount of weight supported thereon, a source of regulated voltage connected to each of said load cells, means for comparing an output of each of said load cells and having an output proportional to the ratio between each, a readout connected to said comparing means in response to an output therefrom to provide a numerical indication of the ratio between the weights supported on said load cells, and a phase detector connected to said comparing means and having an output with a polarity indicative of which of said load cell outputs is larger, said readout being connected to said phase detector.

4. The device of claim 3 including a sample amplifier connected between one of said load cells and said comparing means and having a constant gain over a predetermined range of input current.

5. The device of claim 4 wherein said sample amplifier includes a feedback loop for maintaining a predetermined maximum voltage and an output thereof within a prescribed range of input current.

6. The device of claim 5, including a load amplifier connected between the other of said load cells and said comparing means and having a constant gain over a predetermined range of input current and including a feedback loop, and a plurality of resistors and switching means for selectively connecting individual ones of said resistors in said feedback loop in accordance with input current.

7. The device of claim 3 wherein said source of regulated voltage includes an oscillator circuit and a voltage regulator connected to an input of said oscillator.

8. The device of claim 7 wherein said oscillator includes a pair of amplifying devices each connected to an output of said voltage regulator, an inductance and a capacitance defining a parallel resonant circuit connected between said amplifying devices, an input of each of said amplifying devices connected across respective portions of said inductance, said portions overlapping with one another and the overlapping portion defining an output.

9. An electronic scale comprising a pair of load cells each having an output proportional to the amount of weight supported thereon, a source of regulated voltage connected to each of said load cells and having a plurality of outputs, means for comparing an output of each of said load cells and having an output proportional to the ratio therebetween, a readout connected to said comparing means in response to an output therefrom to provide a numerical indication of the ratio between the weight supported on each of said load cells, said source of regulated voltage including an oscillator circuit and a voltage regulator connected to an input of said oscillator circuit, said oscillator including a pair of transistors each having an emitter connected to an output of said voltage regulator, and inductance and a capacitance forming a parallel resonant circuit, said inductance having a center tap connected to a reference potential and having a pair of intermediate taps each disposed on opposite sides of said center tap adjacent respective ends thereof, a collector of a first of said transistors connected to one end of said inductance and a collector of a second of said transistors connected to the other end of said inductance, the intermediate tap adjacent the one end of said inductance coupled to a base of said second transistor and the intermediate tap adjacent the other end of said inductance being coupled to a base of said first transistor, each of said intermediate taps forming respective outputs of opposite polarity with respect to one another.

10. An electronic scale comprising a pair of load cells each having an output proportional to the amount of weight supported thereon, a source of regulated voltage connected to each of said load cells and having a plurality of outputs, means for comparing an output of each of said load cells and having an output proportional to the ratio therebetween, a readout connected to said comparing means in response to an output therefrom to provide a numerical indication of the ratio between the weight supported on each of said load cells, said source of regulated voltage including an oscillator circuit and a voltage regulator connected to an input of said oscillator circuit, said oscillator including a pair of amplifying devices each connected to an output of said voltage regulator, an inductance and a capacitance defining a parallel resonant circuit connected between said amplifying devices, an input of each of said amplifying devices connected across respective portions of said inductance, said portions overlapping with one another and the overlapping portion defining an output.

11. The device of claim 10 wherein said voltage regulator includes a pair of inputs, one of said inputs connected to an output of said oscillator and the other of said inputs connected to an output of one of said load cells.

References Cited

UNITED STATES PATENTS

Re. 24,969   4/1961   Golding _____ 177—211 XR (Other references on following page)

UNITED STATES PATENTS

| | | | |
|---|---|---|---|
| 2,631,027 | 3/1953 | Payne | 177—210 |
| 2,734,735 | 2/1956 | Payne | 177—210 |
| 2,767,974 | 10/1956 | Ballard et al. | 177—199 |
| 2,767,975 | 10/1956 | Horst et al. | 177—200 |
| 3,153,459 | 10/1964 | Smith et al. | 177—210 XR |
| 3,177,701 | 4/1965 | Geortler | 177—210 XR |
| 3,368,637 | 2/1968 | Green et al. | 177—211 |

ROBERT S. WARD, Jr., Primary Examiner

U.S. Cl. X.R.

177—210, 211